(12) United States Patent
Suzuki (10) Patent No.: US 12,496,857 B2
(45) Date of Patent: Dec. 16, 2025

(54) TIRE

(71) Applicant: Sumitomo Rubber Industries, Ltd., Kobe (JP)

(72) Inventor: Naoya Suzuki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/762,298

(22) Filed: Jul. 2, 2024

(65) Prior Publication Data

US 2025/0050691 A1 Feb. 13, 2025

(30) Foreign Application Priority Data

Aug. 9, 2023 (JP) .................................. 2023-130301

(51) Int. Cl.
*B60C 13/00* (2006.01)

(52) U.S. Cl.
CPC .................................. *B60C 13/001* (2013.01)

(58) Field of Classification Search
CPC .............................. B60C 13/001; B60C 13/02
See application file for complete search history.

(56) References Cited

U.S. PATENT DOCUMENTS

| | | | | |
|---|---|---|---|---|
| 5,645,660 | A | * | 7/1997 | Attinello ............... B60C 13/001 D12/605 |
| 5,807,446 | A | * | 9/1998 | Ratliff, Jr. ............. B60C 13/001 152/523 |
| D405,036 | S | * | 2/1999 | Pung, Jr. ....................... D12/605 |
| D430,518 | S | * | 9/2000 | Baker ........................... D12/605 |
| D875,662 | S | * | 2/2020 | Parr ............................. D12/605 |
| D986,812 | S | * | 5/2023 | Haanketo ...................... D12/605 |
| 2022/0001703 | A1 | * | 1/2022 | Gonzalez .............. B60C 15/024 |

FOREIGN PATENT DOCUMENTS

JP 2019-156213 A 9/2019

* cited by examiner

*Primary Examiner* — Robert C Dye
(74) *Attorney, Agent, or Firm* — Birch, Stewart, Kolasch & Birch, LLP (57) ABSTRACT

A tire has a sidewall portion provided with a protrusion which includes a radially outer design portion, a mark portion and a radially inner design portion. The radially outer design portion has a radially inward contour portion comprising radially inward peak points protruding radially inward. The radially inner design portion is spaced apart from the mark portion in the tire circumferential direction. The radially inner design portion includes a radially outward contour portion having radially outward peak points protruding outward in the tire radial direction. Each of the radially inward peak points is provided at a different position in the tire radial direction than each of the radially outward peak points.

17 Claims, 9 Drawing Sheets

TIRE

TECHNICAL FIELD

The present disclosure relates to a tire.

BACKGROUND ART

Patent Document 1 listed below discloses a pneumatic tire provided with marks and protectors which protrude from a tire sidewall surface.

Patent Document 1: Japanese Patent Application Publication No. 2019-156213

SUMMARY OF THE INVENTION

Problems to be Solved by the Invention

In the pneumatic tire disclosed in the Patent Document 1, if the protectors are increased in size in order to improve the design of the tire sidewall surface, for example, then the marks have to be formed relatively small. Thus, there is such a problem that the visibility of the marks become liable to be deteriorated.

The present disclosure was made in view of the above problem, and a primary object of the present disclosure is to provide a tire in which the design of the tire sidewall portion and the visibility of the mark portion can be improved at the same time.

Means for Solving the Problems

According to the present disclosure, a tire comprises:
a pair of sidewall portions, at least one of which is provided with a protrusion protruding outward in a tire axial direction from a reference surface, wherein
the protrusion comprises a radially outer design portion made up of a graphic symbol located in a radially outer region of the sidewall portion, a mark portion made up of a letter located on the inner side in the tire radial direction than the radially outer design portion, and a radially inner design portion located on the inner side in the tire radial direction than the radially outer design portion, and located away from the mark portion in the tire circumferential direction,
wherein
the radially outer design portion comprises a radially inward contour portion having a plurality of radially inward peak points protruding inward in the tire radial direction,
the radially inner design portion comprises a radially outward contour portion having a plurality of radially outward peak points protruding outward in the tire radial direction, and
each of the radially inward peak points is located at a different position in the tire radial direction from each of the radially outward peak points,

Effects of the Invention

In the tire according to the present disclosure, the design of the sidewall portion and the visibility of the mark portion can be improved by employing the above-described configuration.

DETAILED DESCRIPTION OF THE INVENTION

Hereinafter, an embodiment of the present disclosure will be described in conjunction with accompanying drawings.

The drawings may include exaggerated or simplified depictions different from reality in order to facilitate understanding of the present disclosure.

Figure 1:
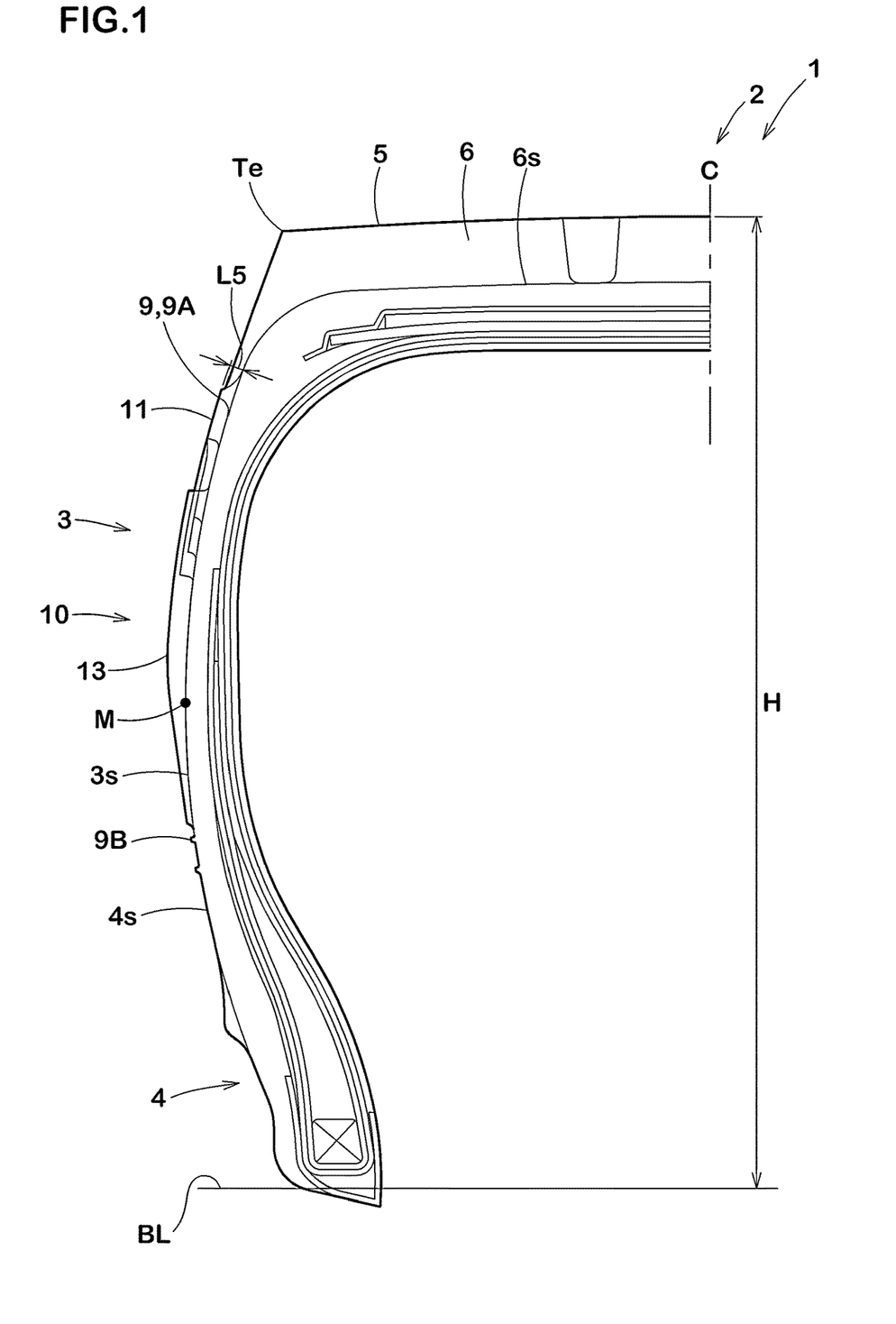
FIG. 1 is a tire meridian cross-sectional view of the left half of a tire as an embodiment of the present disclosure.

FIG. 1 is a tire-meridian cross-sectional view of the left half of a tire 1 as an embodiment of the present disclosure, including the rotation axis Co (shown in FIG. 2) of the tire.

The tire 1 in the present embodiment is a pneumatic tire for passenger cars designed for SUV's (Sport Utility Vehicles) as a preferred embodiment.

The present disclosure, however, can be applied to pneumatic tires for light trucks, heavy duty vehicles and the like, as well as non-pneumatic tires so called airless tire, for example.

In this application including specification and claims, dimensions, positions and the like of each part or portion of the tire 1 refer to those under a standard state unless otherwise noted.

In the case that the tire 1 is a type of pneumatic tire for which various standards have been established, the standard state means a state of the tire when mounted on a standard wheel rim, and inflated to a standard tire pressure, but loaded with no tire load.

The standard wheel rim is a wheel rim specified for the tire 1 in a standard system including standards on which the tire 1 is based, for example, the "Standard rim" in JATMA, "Design Rim" in TRA, "Measuring Rim" in ETRTO.

The standard tire pressure is air pressure specified for the tire 1 in a standard system including standards on which the tire 1 is based, for example, the "maximum air pressure" in JATMA, "INFLATION PRESSURE" in ETRTO, and the maximum air pressure listed in the table "TIRE LOAD LIMITS AT VARIOUS COLD INFLATION PRESSURES" in TRA.

The tire 1 comprises: a tread portion 2 having a pear of tread edges Te; a pair of sidewall portions 3 extending radially inwardly from the respective tread edges Te; and a pair of bead portions 4 located at the radially inner ends of the respective sidewall portions 3.

In FIG. 1, a half of the tread portion 2, one of the sidewall portions 3 and one of the bead portions 4 are shown.

At least one of the sidewall portions 3 is provided with a protrusion 10 protruding outward in the tire axial direction from a reference surface 3s.

In the tire 1 in the present embodiment, only one of the sidewall portions 3 is provided with the protrusion 10.

But, each of the sidewall portions 3 of the tire 1 may be provided with the protrusion 10.

Figure 2:
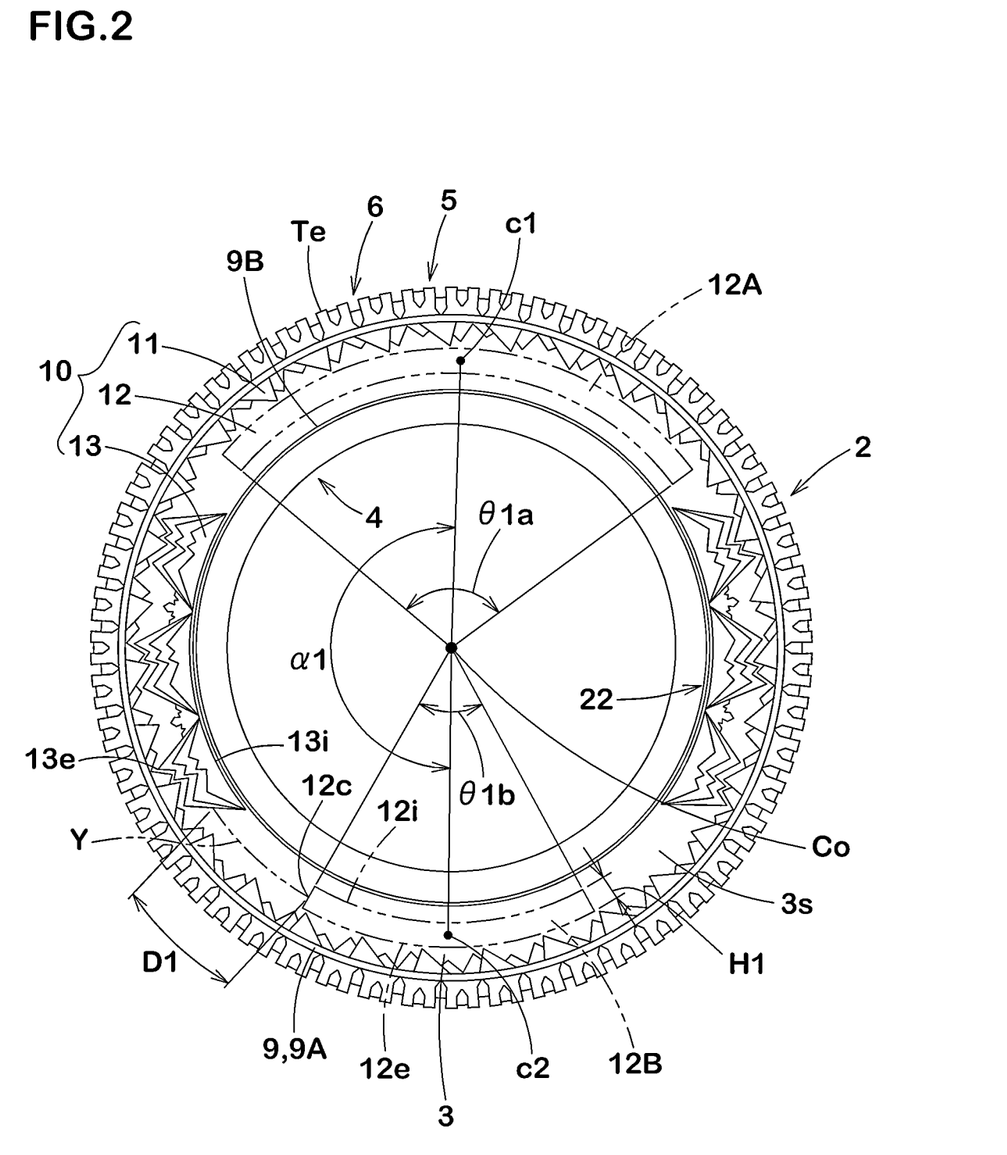
FIG. 2 is a side view of the tire.
Figure 3:
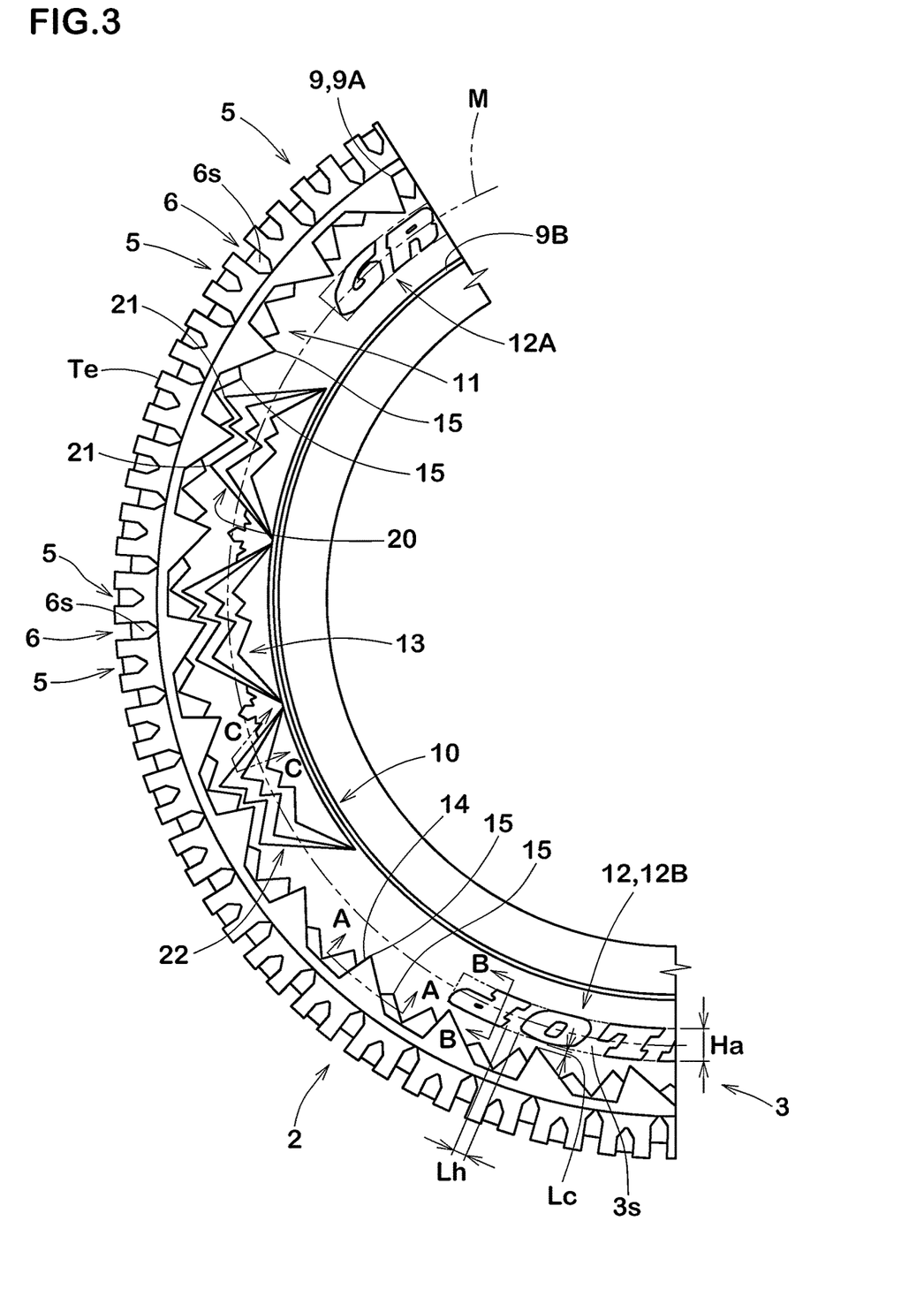
FIG. 3 is an enlarged partial side view of the tire.
Figure 4:
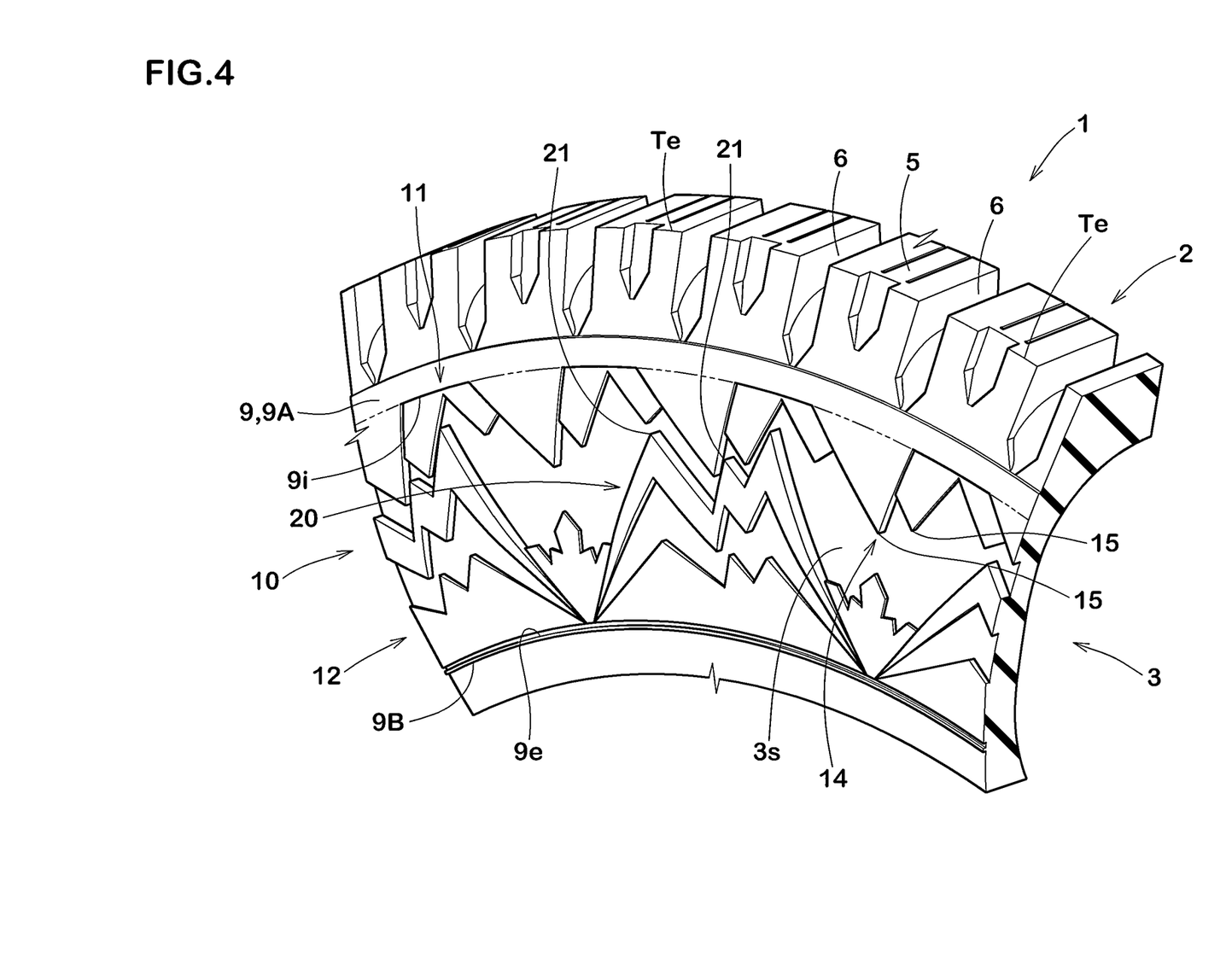
FIG. 4 is a partial perspective view of the tire.

FIG. 2 is a side view of the tire 1 showing the sidewall portion 3 provided with the protrusion 10. FIG. 3 is a closeup of FIG. 2. FIG. 4 is a partial perspective view of the tire 1 showing the sidewall portion 3 shown in FIG. 2.

As shown in FIGS. 1 to 4, the protrusion 10 comprises a radially outer design portion 11, a mark portion 12, and a radially inner design portion 13.

The mark portion 12 is formed as characters.

The radially outer design portion 11 and the radially inner design portion 13 are formed as graphics.

In this specification, the "characters" include alphabetical characters, numerical characters and symbols, and are used to represent the manufacturer's name, brand name, size, etc. of the tire, and the "graphics" include patterns and graphic symbols other than the "characters".

The radially outer design portion 11 is located in a radially outer part of the sidewall portion 3.

The radially outer design portion 11 comprises a radially inward contour portion 14 having a plurality of radially inward peak points 15 protruding inward in the tire radial direction.

The radially inner design portion 13 is located on the inner side in the tire radial direction than the radially outer design portion 11.

The radially inner design portion 13 comprises a radially outward contour portion 20 having a plurality of radially outward peak points 21 protruding outward in the tire radial direction.

Such protrusion 10 can improve the design of the sidewall portion 3, and consequently, the design of the tire 1.

The mark portion 12 is located on the inner side in the tire radial direction than the radially outer design portion 11.

The mark portion 12 is located apart from the radially inner design portion 13 in the tire circumferential direction.

Thereby, the mark portion 12 is clearly distinguished from the radially outer design portion 11 and the radially inner design portion 13, therefore, the mark portion 12 has high visibility.

Each of the radially inward peak points 15 is provided at a different position in the tire radial direction from each of the radially outward peak points 21.

Thereby, the radially inner design portion 13 and the radially outer design portion 11 can be prevented from giving a flat impression, and improve design quality.

Further, as the mark portion 12 is distinguished from the radially inner design portion 13 and the radially outer design portion 11, the visibility of the mark portion 12 is further improved.

Preferably, the minimum distance Lx in the tire radial direction (shown in FIG. 9) between any of the radially inward peak points 15 and any of the radially outward peak points 21 is not less than 1 mm.

The tread portion 2 in the present embodiment is provided with shoulder blocks 5 including the tread edge Te, and shoulder lateral grooves 6 located adjacent to the shoulder blocks 5 and extending from the axially inside to the axially outside of the tread edge Te as shown in FIG. 4.

Here, the tread edges Te are the axial outermost edges of the ground contacting patch of the tire which occurs under a normally inflated loaded state of the tire 1.

In the case that the tire 1 is a type of pneumatic tire for which various standards have been established, the normally inflated loaded state is such that the tire mounted on the above-mentioned standard wheel rim and inflated to the above-mentioned standard tire pressure is brought into contact with a horizontal flat surface at a camber angle of 0 degrees and loaded with a standard tire load.

The standard tire load is a load specified for the tire 1 in a standard system including standards on which the tire 1 is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The sidewall portion 3 in the present embodiment comprises a ring portion 9 extending annularly, continuously in the tire circumferential direction and centering on the tire rotation axis Co.

The ring portion 9 is formed, for example, to protrude outward in the tire axial direction from the reference surface 3s.

The ring portion 9 includes a radially outer first ring portion 9A located on the tread portion 2 side, and a radially inner second ring portion 9B located on the inner side in the tire radial direction than the radially outer first ring portion 9A.

In the present embodiment, the protrusion 10 is formed between the radially outer first ring portion 9A and the radially inner second ring portion 9B.

And the above-mentioned shoulder lateral grooves 6 extend so as to be connected to the radially outer first ring portion 9A.

The radially inner end 9i (shown in FIG. 4) of the radially outer first ring portion 9A is located at a radial height between 75% and 85% of the tire cross-sectional height H (shown in FIG. 1) from the bead baseline BL although not to be particularly limited to this range.

The radially outer end 9e (shown in FIG. 4) of the radially inner second ring portion 9B is located at a radial height between 30% and 40% of the tire cross-sectional height H (shown in FIG. 1) from the bead baseline BL although not to be particularly limited to this range.

Here, the tire cross-sectional height H is the distance in the tire radial direction from the bead baseline BL to the radially outermost position of the tire 1. The bead baseline BL is a straight line extending in parallel to the tire axial direction, passing through a radial position corresponding to the diameter of the standard wheel rim.

The reference surface 3s is made up of a hidden surface that is a surface of the sidewall portion 3 which should be there but hidden inside by partial irregularities such as the ring portion 9, the protrusion 10, a rim protector and the like, and a not hidden surface that is a surface of the sidewall portion 3 which appears outside and smoothly connects with the hidden surface.

Further, in the meridian cross section of the tire, the reference surface 3s in the present embodiment smoothly connect between the groove bottoms 6s of the shoulder lateral grooves 6, and the axially outer surface 4s of the bead portion 4.

Figure 5A:
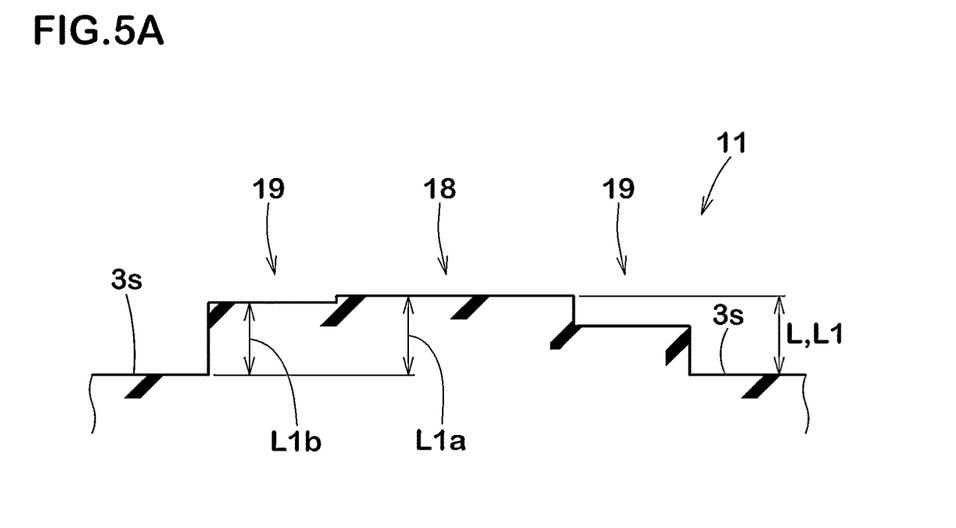
FIG. 5A is a cross-sectional view taken along line A-A in FIG. 3.
Figure 5B:
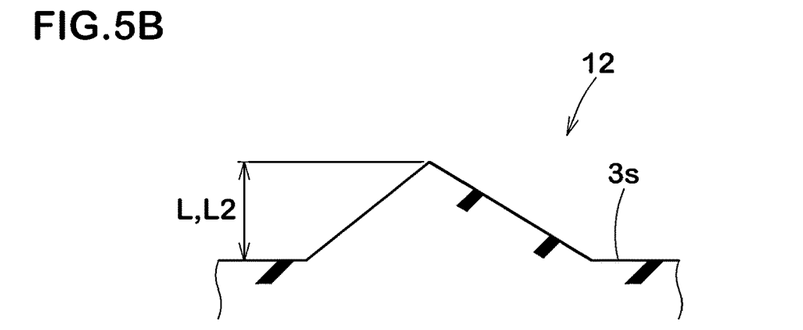
FIG. 5B is a cross-sectional view taken along line B-B in FIG. 3.
Figure 5C:
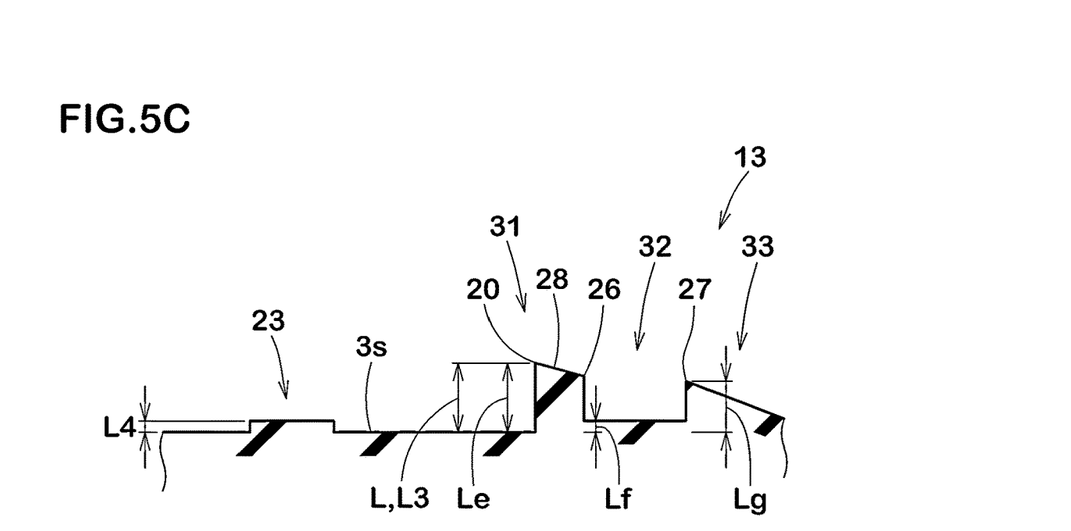
FIG. 5C is a cross-sectional view taken along line C-C in FIG. 3.

FIG. 5A is a cross-sectional view of the radially outer design portion 11 taken along line A-A in FIG. 3. FIG. 5B is a cross-sectional view of the mark portion 12 taken along line B-B in FIG. 3. FIG. 5C is a cross-sectional view of the radially inner design portion 13 taken along line C-C in FIG. 3.

As shown, maximum protruding amounts L of the protrusion 10 in the tire axial direction from the reference surface 3s are preferably not less than 2 mm. Thereby, the protrusion 10 can be clearly identified, so high design quality of the sidewall portion 3 can be ensured.

If the maximum protruding amounts L of the protrusion 10 is excessively large, then, depending on the presence or absence of the protrusion 10, the mass balance will vary greatly and RFV (radial force variation) may deteriorate.

Therefore, the maximum protruding amounts L of the protrusion 10 is more preferably not less than 3 mm, but preferably not more than 5 mm, more preferably not more than 4 mm.

In the present embodiment, the maximum protruding amounts L of the radially outer design portion 11, the mark portion 12 and the radially inner design portion 13 are not less than 2 mm.

In this application, the protruding amount is a dimension measured in the normal direction to the reference surface 3s.

The absolute values of the differences |L1−L2|, |L2−L3| and |L3−L1| between the maximum protruding amount L1 of the radially outer design portion 11, the maximum protruding amount L3 of the radially inner design portion 13, and the maximum protruding amount L2 of the mark portion 12 are preferably not more than 2 mm.

Thereby, the mass balances between the radially outer design portion 11, the mark portion 12 and the radially inner design portion 13 are equalized, and RFV can be improved.

In the present embodiment, the maximum protruding amount L3 of the radially inner design portion 13 is larger than the maximum protruding amount L1 of the radially outer design portion 11. And the difference (L3−L1) of the maximum protruding amount L3 of the radially inner design portion 13 from the maximum protruding amount L1 of the radially outer design portion 11 is set in a range from 0.5 to 1.0 mm, for example.

In the present embodiment, the maximum protruding amount L2 of the mark portion 12 is larger than the maximum protruding amount L1 of the radially outer design portion 11. And the difference (L2−L1) of the maximum protruding amount L2 of the mark portion 12 from the maximum protruding amount L1 of the radially outer design portion 11 is set in a range from 0.5 to 1.0 mm, for example.

Therefore, it is possible to improve the visibility of the mark portion 12 and the visibility of the radially inner design portion 13 located apart from the mark portion 12 in the tire circumferential direction.

In the present embodiment, the mark portion 12 extends in the tire radial direction across the tire maximum width position M as shown in FIG. 3.

In this way, as the mark portion 12 in the present embodiment is provided at the tire maximum width position M where visibility is the best, the visibility of the mark portion 12 is improved.

In the present embodiment, the tire maximum width position M is located at the midpoint in the tire radial direction of the characters (the mark portion 12) In this application, the tire maximum width position M is a position at which the reference surface 3s protrudes to the outermost in the tire axial direction.

The mark portion 12 in the present embodiment is made up of a plurality of characters arranged in the tire circumferential direction.

The characters adjacent in the tire circumferential direction are separated, for example, by the reference surface 3s.

In this way, the mark portion 12 in the present embodiment is formed by the characters and the reference surface 3s between the characters adjacent in the tire circumferential direction.

The minimum widths Lh in the tire circumferential direction of the reference surface 3s located between the letters adjacent in the tire circumferential direction is not more than 150% of the dimension Ha in the tire radial direction of the letters (mark portion 12).

As shown in FIG. 3, the minimum width Lh is the dimension measured at the same height position in the tire radial direction.

As shown in FIG. 2, the mark portion 12 includes a first mark portion 12A and a second mark portion 12B which are separated from each other in the tire circumferential direction.

The first and second mark portions 12A and 12B are arranged in the tire circumferential direction such that the angle $\alpha 1$ around the tire rotation axis Co measured between the midpoint c1 in the tire circumferential direction of the first mark portion 12A and the midpoint c2 in the tire circumferential direction of the second mark portion 12B is in a range from 150 to 210 degrees.

Such mark portions 12A and 12B equalize the mass balance of the tire 1 in the tire circumferential direction and can suppress the deterioration of RFV.

Further, as to the size in the tire circumferential direction of the mark portion 12 in term of an angle around the tire rotation axis Co, as shown in FIG. 2, the angle $\theta 1a$ of the first mark portion 12A and the angle $\theta 1b$ of the second mark portion 12B are preferably not less than 50 degrees, more preferably not less than 60 degrees, but preferably not more than 120 degrees, more preferably not more than 110 degrees.

This allows the mark portion 12 to be easily recognized (read) and improves the design quality.

The angle $\theta 1a$ is measure between both ends in the tire circumferential direction of the first mark portion 12A, around the tire rotation axis Co.

The angle $\theta 1b$ is measured between both ends in the tire circumferential direction of the second mark portion 12B, around the tire rotation axis Co.

In order to suppress the deterioration of RFV, it is preferred that the absolute value of the difference $|\theta 1a-\theta 1b|$ between the angle $\theta 1a$ of the first mark portion 12A and the angle $\theta 1b$ of the second mark portion 12B is not more than 60 degrees, more preferably not more than 50 degrees.

The dimension H1 (shown in FIG. 2) in the tire radial direction of the mark portion 12 is preferably not less than 10%, but preferably not more than 30%, more preferably not more than 20%, still preferably not more than 15% of the tire cross-sectional height H.

By setting the dimension H1 to 10% or more of the tire cross-sectional height H, the visibility of the mark portion 12 is increased.

By setting the dimension H1 to 20% or less of the tire cross-sectional height H, the size or area of the radially outer design portion 11 is secured, and high design quality of the sidewall portion 3 can be ensured.

In the present embodiment, the radially outer design portion 11 does not extend in the tire radial direction across the tire maximum width position M, and is separated from the radially inner design portion 13 by the reference surface 3s.

In this way, as the radially outer design portion 11 is located radially outside the tire maximum width position M and is not connected to the radially inner design portion 13, the radially outer design portion 11 can give sharpness to the appearance of the sidewall portion 3 and can improve the design quality.

In the present embodiment, the radially outer design portion 11 extends continuously in the tire circumferential direction. Thus, the radially inward contour portion 14 in this embodiment extends annularly, continuously in the tire circumferential direction.

Further, the radially outer design portion 11 in this example is connected to the radially outer first ring portion 9A and extends inward in the tire radial direction.

And the radially outer design portion 11 faces the mark portion 12 in the tire radial direction, and faces the radially inner design portion 13 in the tire radial direction.

Figure 6:
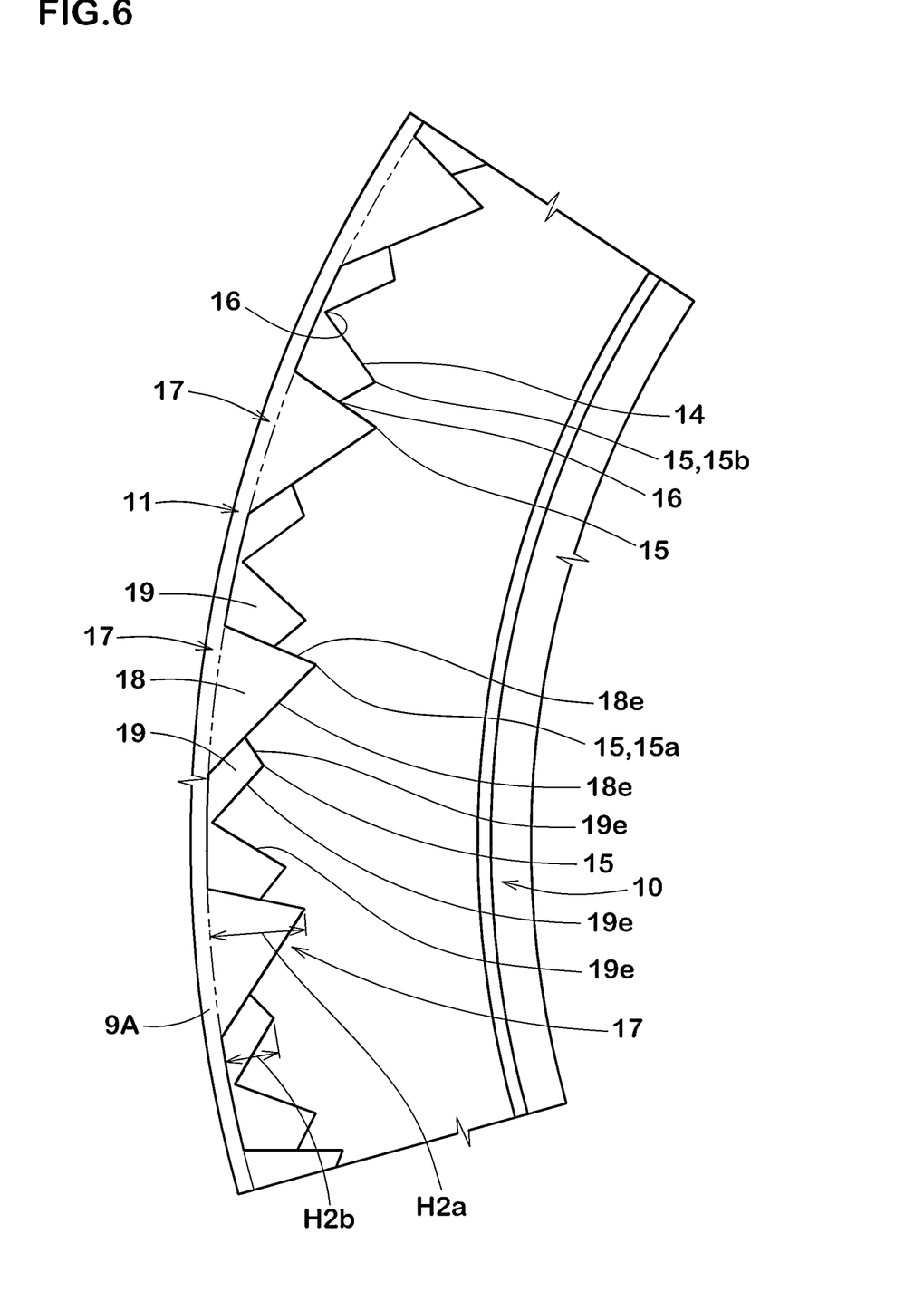
FIG. 6 is an enlarged partial side view of the tire.

FIG. 6 is an enlarged partial side view of the tire 1 which shows the radially outer design portion 11, while omitting the radially inner design portion 13.

As shown, the radially outer design portion 11 is made up of a plurality of first designs 17 arranged in the tire circumferential direction.

In the present embodiment, each of the first designs 17 is made up of a main portion 18 and a pair of sub portions 19 adjacent to both sides of the main portion 18 in the tire circumferential direction.

The main portion 18 in this example extends convexly and inward in the tire radial direction from the radially outer first ring portion 9A in a tapered manner, having a pair of main side edges 18e.

The sub portions 19 in this example each extend convexly and inward in the tire radial direction in a tapered manner, having a pair of secondary side edges 19e.

In the present embodiment, one of the paired secondary side edges 19e is connected to one of the main side edges 18e, and the other of the paired secondary side edges 19e is connected to one of the secondary side edges 19e of the circumferentially adjacent next first design 17.

The intersection of the paired main side edges 18e forms an inward peak point 15, and also, the intersection of the paired secondary side edges 19e forms an inward peak point 15.

The radially outer design portion 11 may be formed by alternately arranging the first design 17 and a design whose shape is symmetrical to the first design 17 about a tire radial direction line as the axis of symmetry.

The radially inward contour portion 14 extends continuously in the tire circumferential direction.

The radially inward contour portion 14 in the present embodiment extends in a zigzag manner in the tire circumferential direction.

The radially inward contour portion 14 comprises: a plurality of radially inward peak points 15; and a plurality of radially outward base points 16 concave toward the outside in the tire radial direction, and adjacent to the radially inward peak points 15 in the tire circumferential direction.

In each of the first designs 17 in the present embodiment, the radially inward peak points 15 are located at different positions in the tire radial direction from each other;

the radially outward base points 16 are located at different positions in the tire radial direction from each other; and the radially inward peak points 15 and the radially outward base points 16 are located at different positions in the tire radial direction from each other.

Such radially inward contour portion 14 can improve the design of the sidewall portion 3.

As shown in FIG. 5A, in the present embodiment, the protruding amount L1a of the main portion 18 in the tire axial direction from the reference surface 3s is larger than the protruding amount L1b of each sub portion 19 in the tire axial direction from the reference surface 3s.

Such first designs 17 lined up can give a change in appearance to the radially outer design portion 11, and improve the design quality.

The protruding amount L1a of the main portion 18 is, for example, the same as the protruding amount L5 (shown in FIG. 1) of the radially outer first ring portion 9A in the tire axial direction from the reference surface 3s.

The protruding amount L1b of each sub portion 19 is preferably not less than 50%, more preferably not less than 55%, but preferably not more than 95%, more preferably not more than 93% of the protruding amount L1a of the main portion 18 although not particularly limited thereto.

As shown in FIG. 6, in each of the first designs 17, the maximum dimension H2a in the tire radial direction of the main portion 18 is larger than the maximum dimension H2b in the tire radial direction of each sub portion 19.

In other words, the radially inward peak point 15a of the main portion 18 is located on the inner side in the tire radial direction than the radially inward peak points 15b of the sub portions 19.

Such first designs 17 can further improve the design of the sidewall portion 3.

Although not particularly limited, the maximum dimension H2a in the tire radial direction of the main portion 18 is preferably not less than 80%, more preferably not less than 90%, but preferably not more than 125%, more preferably not more than 110% of the dimension H1 (shown in FIG. 2) in the tire radial direction of the mark portion 12.

In the side view of the tire 1, the shortest distance Lc (shown in FIG. 3) between each of the inward peak points 15 and the mark portion 12 is preferably not less than 5%, more preferably not less than 10%, but preferably not more than 30%, more preferably not more than 25% of the maximum dimension H2a (shown in FIG. 6) of the main portion 18.

By setting the shortest distance Lc to 5% or more of the maximum dimension H2a of the main portion 18, the visibility of the mark portion 12 is maintained at a high level.

By setting the shortest distance Lc to 30% or less of the maximum dimension H2a of the main portion 18, it becomes possible to prevent the mark portion 12 and the radially outer design portion 11 from giving a flat impression.

In the present embodiment, as shown in FIG. 3, the radially inner design portion 13 extends in the tire radial direction across the tire maximum width position M.

In this way, as the radially inner design portion 13 is provided at the tire maximum width position M where visibility is the best, the visibility of the radially inner design portion 13 is improved.

The radially inner design portion 13 is, for example, separated from the radially inner second ring portion 9B in the tire radial direction.

The radially inner design portion 13 and the mark portion 12 are separated from each other in the tire circumferential direction between by a separation distance D1 (shown in FIG. 2) which is preferably not less than 20 mm, but preferably not more than 60 mm, more preferably not more than 40 mm.

By setting the separation distance D1 to 20 mm or more, as the radially inner design portion 13 and the mark portion 12 are clearly distinguished, high visibility of the mark portion 12 is ensured.

By setting the separation distance D1 to 60 mm or less, the area where the mark portion 12 and the radially inner design portion 13 are not formed, becomes small, and the tire mass balance in the tire circumferential direction is ensured, so RFV is improved.

Here, the separation distance D1 is defined by the length along a tire circumferential direction line Y (shown in FIG. 2) passing through the intermediate position 12c (shown in FIG. 2) in the tire radial direction of the mark portion 12 (characters).

The radially outer end 13e (shown in FIG. 2) of the radially inner design portion 13 is located on the outer side in the tire radial direction than the radially outer end 12e (shown in FIG. 2) of the mark portion 12.

The radially inner end 13i (shown in FIG. 2) of the radially inner design portion 13 is located on the inner side in the tire radial direction than the radially inner end 12i (shown in FIG. 2) of the mark portion 12.

Such radially inner design portion 13 can enhance the sense of unity with the radially outer design portion 11 adjacent thereto on the outer side in the tire radial direction, and thereby, further improve the visibility of the mark portion 12.

The radially inner design portion 13 is formed by arranging a plurality of second designs 22 in the tire circumferential direction.

Each of the second designs 22 is, for example, formed in a tapered shape in which the length in the tire circumferential direction of the second design 22 is decreased toward the outside in the tire radial direction.

Figure 7:
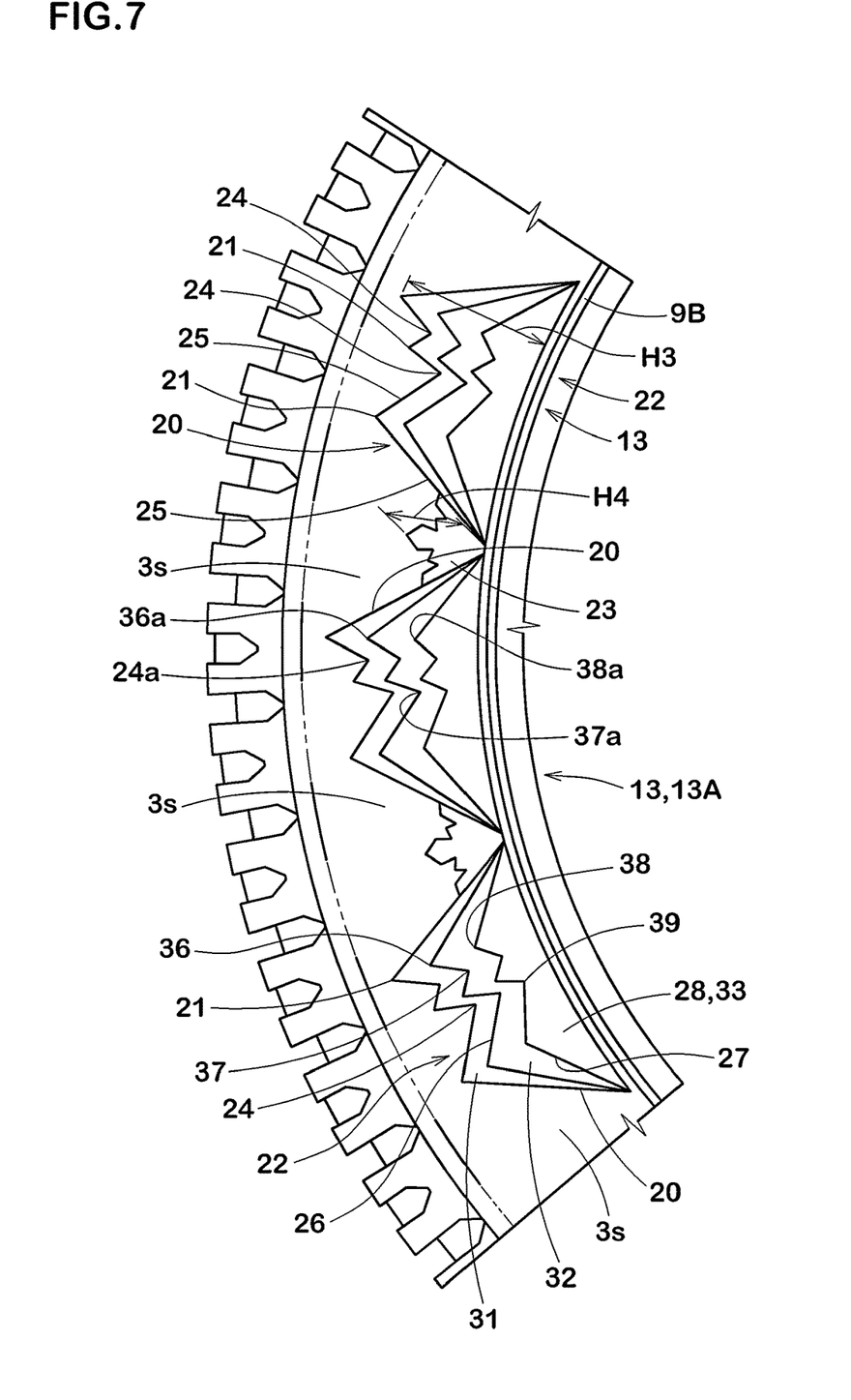
FIG. 7 is an enlarged partial side view of the tire.

FIG. 7 is an enlarged partial side view of the tire 1 which shows the radially inner design portion 13, while omitting the radially outer design portion 11.

As shown, in the present embodiment, the radially outward contour portion 20 of the radially inner design portion 13 extends in a zigzag shape in the tire circumferential direction.

Specifically, the radially outward contour portion 20 comprises: a plurality of radially outward peak points 21; a plurality of radially inward base points 24 being circumferentially adjacent to the radially outward peak points 21 and concave toward the inside in the tire radial direction; and two side edges 25 extending inward in the tire radial direction from each of the radially outward peak points 21.

In each of the second designs 22 in the present embodiment, the radially outward peak points 21 are shifted from each other in the tire radial direction.

Further, the radially inward base points 24 are shifted from each other in the tire radial direction.

Furthermore, the radially outward peak points 21 and the radially inward base points 24 are shifted from each other in the tire radial direction.

Such radially outward contour portion 20 can enhance the design of the sidewall portion 3.

Figure 8:
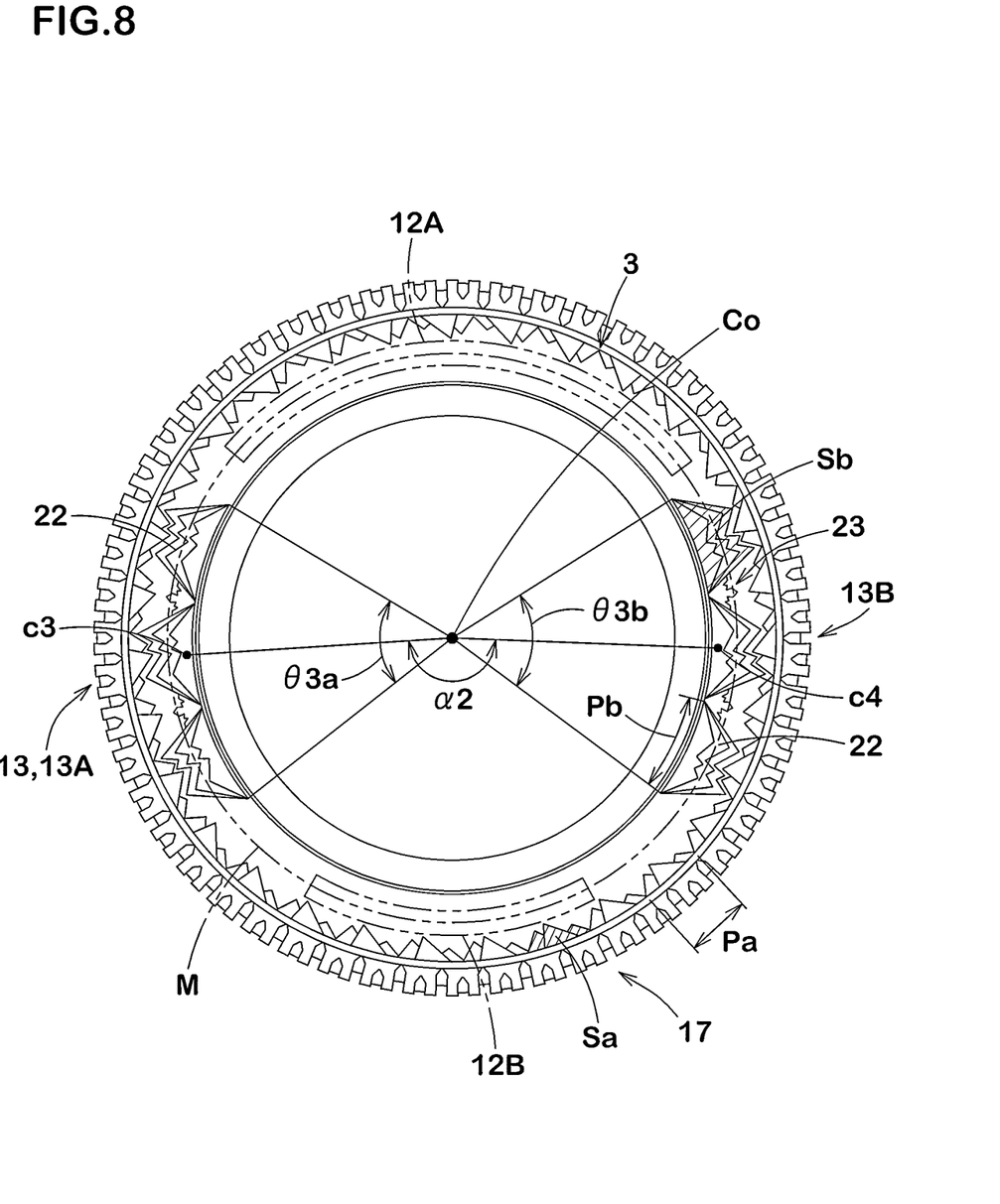
FIG. 8 is the side view of the tire.

FIG. 8 is the same side view as FIG. 2, but provided with reference signs differently.

As shown, the radially inner design portion 13 in the present embodiment comprises: a first group 13A of the second designs 22 arranged in the tire circumferential direction; and a second group 13B of the second designs 22 arranged in the tire circumferential direction.

The first group 13A and the second group 13B are separated from each other in the tire circumferential direction by an angle $\alpha 2$ in a range from 150 to 210 degrees around the tire rotation axis Co.

Here, the angle $\alpha 2$ is between the midpoint c3 in the tire circumferential direction of the first group 13A, and the midpoint c4 in the tire circumferential direction of the second group 13B.

Such radially inner design portion 13 can suppress the deterioration of RFV.

In the sidewall portion 3 in the present embodiment, the first mark portion 12A or the second mark portion 12B is arranged between the first group 13A and the second group 13B, thereby, the deterioration of RFV can be further suppressed.

In each of the first group 13A and the second group 13B, the reference surface 3s is arranged between the second designs 22 adjacent to each other in the tire circumferential direction.

The second group 13B may be formed by arranging a plurality of designs (not shown) each having a shape symmetrical to the second design 22 about a tire radial direction line as the axis of symmetry.

As to the size in the tire circumferential direction of each of the first group 13A and the second group 13B in term of an angle around the tire rotation axis Co, as shown in FIG. 8,
the angle $\theta 3a$ of the first group 13A and the angle $\theta 3b$ of the second group 13B are preferably not less than 50 degrees, more preferably not less than 60 degrees, but preferably not more than 90 degrees, more preferably not more than 80 degrees.

Thereby, the sizes of the first group 13A and the second group 13B in the tire circumferential direction and the sizes of the first mark portion 12A and the second mark portion 12B in the tire circumferential direction are equalized, and the deterioration of RFV can be suppressed.

Here, the angle $\theta 1a$ is between both ends in the tire circumferential direction of the first mark portion 12A around the tire rotation axis Co.

The angle $\theta 1b$ is between both ends in the tire circumferential direction of the second mark portion 12B around the tire rotation axis Co.

The absolute value of the difference $|\theta 3a-\theta 3b|$ between the angle $\theta 3a$ of the first group 13A and the angle $\theta 3b$ of the second group 13B is preferably not more than 50 degrees, more preferably not more than 30 degrees.

In the present embodiment, the absolute value of the difference $|\theta 3a-\theta 3b|$ is 0 degrees.

In the side view of the tire 1, the area Sb of the second design 22 is larger than the area Sa of the first design 17 in this example.

The arrangement pitch Pb in the tire circumferential direction of the second designs 22 is larger than the arrangement pitch Pa in the tire circumferential direction of the first designs 17 in this example.

In this way, by relatively increasing the area Sb and the arrangement pitch Pb for the second designs 22 located at the tire maximum width position M where visibility is the best, it becomes possible to further improve the design of the sidewall portion 3.

In FIG. 8, the area Sa and the area Sb are shown by applying hatching.

As shown in FIGS. 7 and 8, in each of the first group 13A and the second group 13B in the present embodiment, a third design 23 is disposed to connect between the second designs 22 adjacent to each other in the tire circumferential direction.

The protruding amount L4 (shown in FIG. 5C) of the third design 23 in the tire axial direction from the reference surface 3s is smaller than the maximum protruding amount L3 of the radially inner design portion 13.

Further, the maximum dimension H4 in the tire radial direction of the third design 23 is smaller than the dimension H3 in the tire radial direction of the second design 22.

Furthermore, a substantive part of the third design 23 does not cross the tire maximum width position M in the tire radial direction.

Such third design 23 can improve the design of the sidewall portion 3 while suppressing an increase in the mass of the tire 1.

The second design 22 has an axially outward surface 28 facing outward in the tire axial direction.

The axially outward surface 28 comprises a first portion 31 (shown in FIG. 7) having a first protruding amount Le (shown in FIG. 5C) in the tire axial direction from the reference surface 3s, and a second portion 32 (shown in FIG. 7) having a second protruding amount Lf (shown in FIG. 5C) in the tire axial direction from the reference surface 3s.

The first portion 31 includes the radially outward contour portion 20.

The first portion 31 further includes a second radially outward contour portion 26 which is substantially parallel to the radially outward contour portion 20.

That is, the second radially outward contour portion 26 comprises: a plurality of second radially outward peak points 36 protruding outward in the tire radial direction; and a plurality of second radially inward base points 37 being circumferentially adjacent to the second radially outward peak points 36 and concave toward the inside in the tire radial direction.

The expression "substantially parallel" not only means parallel as described in the dictionaries, but also means that the number of the second radially outward peak points 36 and the number of the second radially inward base points 37 are respectively the same as the number of the radially outward peak points 21 and the number of the radially inward base points 24. Furthermore, the expression "substantially parallel" means that the second radially outward peak points 36 and second radially inward base points 37 are arranged in the tire circumferential direction in the same order as the radially outward peak points 21 and radially inward base points 24.

The second protruding amount Lf is smaller than the first protruding amount Le. The second portion 32 having such second protruding amount Lf suppresses an excessive increase in the mass of the tire 1.

In order to effectively derive such advantageous effect, the second protruding amount Lf is preferably set to be smaller than 50% of the first protruding amount Le.

However, the second protruding amount Lf is preferably not less than 20% of the first protruding amount Le although not particularly limited thereto.

The axially outward surface 28 comprises a third portion 33 having a third protruding amount Lg (shown in FIG. 5C) which is larger than the second protruding amount Lf.

The third portion 33 comprises a third radially outward contour portion 27 which is located inward in the tire radial direction than the second portion 32 and is substantially parallel to the radially outward contour portion 20.

The third radially outward contour portion 27 comprises
a plurality of third radially outward peak points 38 protruding outward in the tire radial direction, and
a plurality of third radially inward base points 39 being circumferentially adjacent to the third radially outward peak points 38 and concave toward the inside in the tire radial direction.

The expression "substantially parallel" not only means parallel as described in the dictionaries, but also means that the number of the third radially outward peak points 38 and the number of the third radially inward base points 39 are respectively the same as the number of the radially outward peak points 21 and the number of the radially inward base points 24.

Further, the expression "substantially parallel" means that the third radially outward peak points 38 and third radially inward base points 39 are arranged in the tire circumferential direction in the same order as the radially outward peak points 21 and radially inward base points 24.

The third protruding amount Lg is the same as the first protruding amount Le, for example.

Such axially outward surface 28 enlarges the edge of the radially inner design portion 13, and enhances the impression of the design, thereby improving the design quality of the sidewall portion 3.

In the second design 22, at least one of the radially inward base points 24a is located, for example, on the inner side in the tire radial direction than at least one of the second radially outward peak points 36a.

In the present embodiment, at least one of the radially inward base points 24a is located on the inner side in the tire radial direction than each of the second radially outward peak points 36a.

In the second design 22, at least one of the second radially inward base points 37a is located, for example, on the inner side in the tire radial direction than at least one of the third radially outward peak points 38a.

In the present embodiment, at least one of the second radially inward base points 37a is located on the inner side in the tire radial direction than one of the third radially outward peak points 38a.

Figure 9:
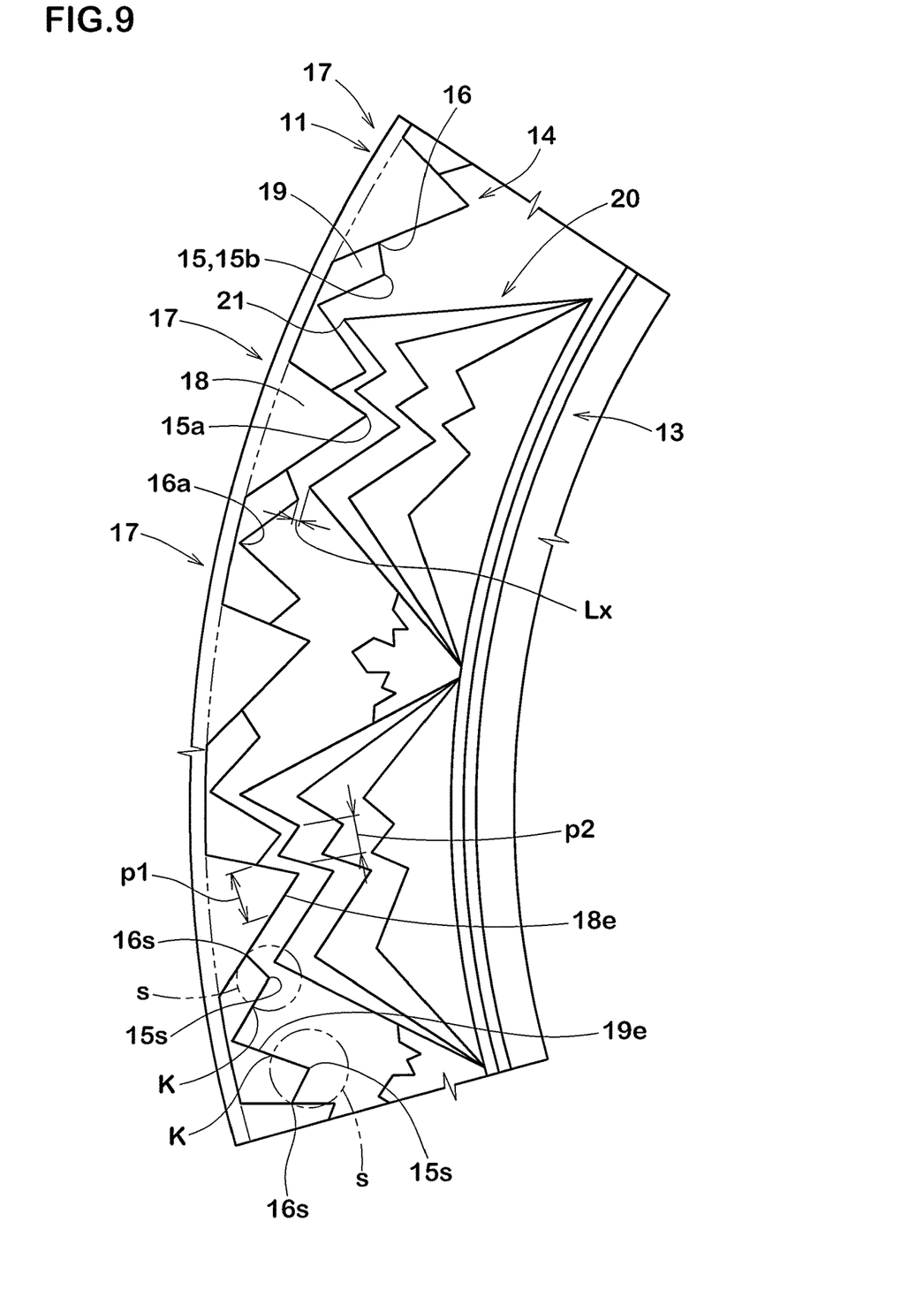
FIG. 9 is an enlarged partial side view of the tire.

FIG. 9 is an enlarged partial side view of the tire 1 showing the radially outer design portion 11 and the radially inner design portion 13.

As shown, at least one of the radially inward peak points 15 in the radially outer design portion 11 is located on the inner side in the tire radial direction than at least one of the radially outward peak points 21 in the radially inner design portion 13.

Thereby, at locations where the radially outer design portion 11 and the radially inner design portion 13 are adjacent to each other in the tire radial direction, the boundary between the radially inward contour portion 14 and the radially outward contour portion 20 becomes difficult to see, and there appears a sense of unity between the radially outer design portion 11 and the radially inner design portion 13, which improves the design.

Further, such radially outer design portion 11 and radially inner design portion 13 make the mark portion 12 clear.

Further, in the case where the radially outer design portion 11 and the radially inner design portion 13 are arranged at the same position in the tire circumferential direction, the tire mass variation in the tire radial direction becomes reduced, and RFV is improved.

In the present embodiment, the radially inward peak point 15a of the main portion 18 is located on the inner side in the tire radial direction than any of the radially outward peak points 21.

Further, the radially inward peak point 15b of one of the sub portions 19 is also located on the inner side in the tire radial direction than any of the radially outward peak points 21.

In the present embodiment, at least one of the radially outward base points 16 is located on the outer side in the tire radial direction than any of the radially outward peak points 21.

In the present embodiment, the radially outward base points 16a formed between the circumferentially adjacent first designs 17 are located on the outer side in the tire radial direction than any of the radially outward peak points 21.

As shown in FIG. 9, each of the shortest zigzag pitches p1 of the radially inward contour portion 14 is preferably not less than 0.5, more preferably not less than 0.7, but preferably not more than 2.0, more preferably not more than 1.8 times any of the shortest zigzag pitches p2 of the radially outward contour portion 20.

By setting each of the shortest zigzag pitches p1 of the radially inward contour portion 14 to 0.5 to 2.0 times any of the shortest zigzag pitches p2 of the radially outward contour portion 20, a sense of unity appears between the design of the radially outer design portion 11 and the design of the radially inner design portion 13, and the design quality can be further improved.

Moreover, when the radially outer design portion 11 and the radially inner design portion 13 have a sense of unity, it becomes easier to distinguish them from the mark portion 12, and the visibility of the mark portion 12 is improved.

Here, the shortest pitch p1 of the radially inward contour portion 14 is the shortest distance between the radially outward base point 16s closest to the radially inward peak point 15s and an intersection point K.

The intersection K is a point where a circle(s) centered on the inward peak point 15s and passing through the radially outward base point 16s, intersects with the main side edge 18e or the secondary side edge 19e connected to the radially inward peak point 15.

The shortest pitch p2 of the radially outward contour portion 20 is determined in the same manner as the shortest pitch p1.

While detailed description has been made of an especially preferable embodiment of the present disclosure, the present disclosure can be embodied in various forms without being limited to the illustrated embodiment.

Statement of the Present Disclosure

The present disclosure is as follows:

[Present Disclosure 1]

A tire comprising a sidewall portion having a tire maximum width position and provided with a protrusion protruding outward in a tire axial direction from a reference surface, wherein
the protrusion includes a radially outer design portion made up of graphics and located in a radially outer part of the sidewall portion, a mark portion made up of letters located on the inner side in the tire radial direction than the radially outer design portion, and a radially inner design portion located on the inner side in the tire radial direction than the radially outer design portion,
the radially outer design portion has a radially inward contour portion comprising a plurality of radially inward peak points protruding inward in the tire radial direction,
the radially inner design portion is located away from the mark portion in the tire circumferential direction,
the radially inner design portion has a radially outward contour portion comprising a plurality of radially outward peak points protruding outward in the tire radial direction, and
positions in the tire radial direction of the radially inward peak points are different from any of positions in the tire radial direction of the radially outward peak points.

[Present Disclosure 2]

The tire according to Present Disclosure 1, wherein the mark portion extends in the tire radial direction across the tire maximum width position.

[Present Disclosure 3]

The tire according to Present Disclosure 1 or 2, wherein the radially inner design portion extends in the tire radial direction across the tire maximum width position.

[Present Disclosure 4]

The tire according to Present Disclosure 1, 2 or 3, wherein the radially outer design portion does not extend in the tire radial direction across the tire maximum width position, and
the radially outer design portion is separated from the radially inner design portion by the reference surface.

[Present Disclosure 5]

The tire according to Present Disclosure 1, 2, 3 or 4, wherein at least one of the radially inward peak points is located on the inner side in the tire radial direction than at least one of the radially outward peak points.

[Present Disclosure 6]

The tire according to any one of Present Disclosures 1 to 5, wherein the radially outward contour portion and the radially inward contour portion each extend in a zigzag shape in the tire circumferential direction.

[Present Disclosure 7]

The tire according to any one of Present Disclosures 1 to 6, wherein the radially outer design portion is formed by a plurality of first designs arranged in the tire circumferential direction.

[Present Disclosure 8]

The tire according to Present Disclosure 7, wherein the radially inner design portion is formed by a plurality of second designs arranged in the tire circumferential direction.

[Present Disclosure 9]

The tire according to Present Disclosure 8, wherein the area of the second design is larger than the area of the first design, and
an arrangement pitch in the tire circumferential direction of the second designs is larger than an arrangement pitch in the tire circumferential direction of the first designs. [Present Disclosure 10]

The tire according to Present Disclosure 8 or 9, wherein the radially inner design portion comprises a first group of the second designs arranged in the tire circumferential direction, and a second group of the second designs arranged in the tire circumferential direction, and
the first group and the second group are separated from each other by a distance in the tire circumferential direction corresponding to an angle of from 150 to 210 degrees around the tire rotational axis.

[Present Disclosure 11]

The tire according to Present Disclosure 6, wherein each of the shortest zigzag pitches of the radially inward contour portion is in a range from 0.5 to 2 times any of the shortest zigzag pitches of the radially outward contour portion.

[Present Disclosure 12]

The tire according to any one of Present Disclosures 1 to 11, wherein the radially outer end of the radially inner design portion is located radially outside the radially outer end of the mark portion, and
the radially inner end of the radially inner design portion is located radially inside the radially inner end of the mark portion.

[Present Disclosure 13]

The tire according to any one of Present Disclosures 1 to 12, wherein a maximum protruding amount of the protrusion in the tire axial direction from the reference surface is not less than 2 mm.

[Present Disclosure 14]

The tire according to Present Disclosure 13, wherein the absolute values of the differences between the maximum protruding amount of the radially outer design portion, the maximum protruding amount of the radially inner design portion, and the maximum protruding amount of the mark portion are not more than 2 mm.

[Present Disclosure 15]

The tire according to Present Disclosure 8, wherein the second design has an axially outward surface including: a first portion having a first protruding amount in the tire axial direction from the reference surface; and a second portion having a second protruding amount in the tire axial direction from the reference surface, and the first portion comprises the radially outward contour portion and a second radially outward contour which is substantially parallel to the radially outward contour.

[Present Disclosure 16]

The tire according to Present Disclosure 15, wherein the second protruding amount is smaller than the first protruding amount.

[Present Disclosure 17]

The tire according to Present Disclosure 16, wherein the axially outward surface of the radially inner design portion comprises a third portion having a third protruding amount greater than the second protruding amount, and the third portion has a third radially outward contour portion located axially inside the second portion and substantially parallel to the radially outward contour portion.

DESCRIPTION OF THE REFERENCE SIGNS 1 tire
3 sidewall portion
10 protrusion
11 radially outer design portion
12 mark portion
13 radially inner design portion
14 radially inward contour portion
15 radially inward peak point
20 radially outward contour portion
21 radially outward peak point

The invention claimed is:

1. A tire comprising a sidewall portion having a tire maximum width position and provided with a protrusion protruding outward in a tire axial direction from a reference surface,
wherein
the protrusion includes
a radially outer design portion made up of graphics and located in a radially outer part of the sidewall portion,
a mark portion made up of letters located on the inner side in the tire radial direction than the radially outer design portion, and
a radially inner design portion located on the inner side in the tire radial direction than the radially outer design portion,
wherein
the radially outer design portion has a radially inward contour portion comprising a plurality of radially inward peak points protruding inward in the tire radial direction,
the radially inner design portion is located away from the mark portion in the tire circumferential direction,
the radially inner design portion has a radially outward contour portion comprising a plurality of radially outward peak points protruding outward in the tire radial direction, and
positions in the tire radial direction of the radially inward peak points are different from any of positions in the tire radial direction of the radially outward peak points,
wherein
the radially outer design portion extends continuously in the tire circumferential direction,
the radially inward contour portion extends continuously in the tire circumferential direction in a zigzag manner,
the radially outer design portion is made up of a plurality of first designs arranged continuously in the tire circumferential direction,
each first design is made up of a main portion and a pair of sub portions adjacent to both sides of the main portion in the tire circumferential direction,
a protruding amount of the main portion in the tire axial direction from the reference surface is larger than a protruding amount of each sub portion in the tire axial direction from the reference surface,
each of the main portion and the sub portions has one of the radially inward peak points,
the radially inward peak point of the main portion is positioned radially inside the radially inward peak points of the sub portions, and
each of the radially inward peak points forms one of zigzag vertices of the radially inward contour portion.

2. The tire according to claim 1, wherein
the mark portion extends in the tire radial direction across the tire maximum width position.

3. The tire according to claim 2, wherein
the radially inner design portion extends in the tire radial direction across the tire maximum width position.

4. The tire according to claim 3, wherein
the radially outer design portion does not extend in the tire radial direction across the tire maximum width position, and
the radially outer design portion is separated from the radially inner design portion by the reference surface.

5. The tire according to claim 1, wherein
at least one of the radially inward peak points is located on the inner side in the tire radial direction than at least one of the radially outward peak points.

6. The tire according to claim 1, wherein
the radially outer end of the radially inner design portion is located radially outside the radially outer end of the mark portion, and
the radially inner end of the radially inner design portion is located radially inside the radially inner end of the mark portion.

7. The tire according to claim 1, wherein
a maximum protruding amount of the protrusion in the tire axial direction from the reference surface is not less than 2 mm.

8. The tire according to claim 7, wherein
the absolute values of the differences between the maximum protruding amount of the radially outer design portion, the maximum protruding amount of the radially inner design portion, and the maximum protruding amount of the mark portion are not more than 2 mm.

9. The tire according to claim 1, wherein
the sidewall portion is provided with a ring portion extending continuously in the tire circumferential direction and centering on a tire rotation axis,
the ring portion protrudes outward in the tire axial direction from the reference surface,
the ring portion includes a radially outer first ring portion and a radially inner second ring portion,
the protrusion is formed between the radially outer first ring portion and the radially inner second ring portion, and the radially outer design portion extends radially inwardly from the radially outer first ring portion.

10. The tire according to claim 9, wherein
the main portion of the first design extends radially inwardly in a tapered manner to have a pair of side edges which intersect with each other and of which intersecting point forms the radially inward peak point of the main portion, and
each of the sub portions of the first design extends radially inwardly in a tapered manner to have a pair of side edges which intersect with each other and of which intersecting point forms the radially inward peak point of the sub portion.

11. The tire according to claim 1, wherein
the radially outward contour portion extends in a zigzag shape in the tire circumferential direction,
the radially inner design portion is formed by a plurality of second designs arranged in the tire circumferential direction, and
each second design comprises two or more of said radially outward peak points, and has a tapered shape having side edges in which a distance between the side edges measured in the tire circumferential direction is decreased toward the outside in the tire radial direction.

12. The tire according to claim 11, wherein
the area of the second design is larger than the area of the first design, and
an arrangement pitch in the tire circumferential direction of the second designs is larger than an arrangement pitch in the tire circumferential direction of the first designs.

13. The tire according to claim 11, wherein
each of the shortest zigzag pitches of the radially inward contour portion is in a range from 0.5 to 2 times any of the shortest zigzag pitches of the radially outward contour portion.

14. The tire according to claim 11, wherein
the second design has an axially outward surface including
a first portion having a first protruding amount in the tire axial direction from the reference surface, and
a second portion having a second protruding amount in the tire axial direction from the reference surface, and
the first portion comprises the radially outward contour portion and a second radially outward contour which is substantially parallel to the radially outward contour.

15. The tire according to claim 14, wherein
the second protruding amount is smaller than the first protruding amount.

16. The tire according to claim 15, wherein
the axially outward surface of the radially inner design portion comprises a third portion having a third protruding amount greater than the second protruding amount,
the third portion has a third radially outward contour portion located axially outside the second portion and substantially parallel to the radially outward contour portion.

17. The tire according to claim 11, wherein
the radially inner design portion comprises a first group of the second designs arranged in the tire circumferential direction and a second group of the second designs arranged in the tire circumferential direction,
the first group and the second group are separated from each other in the tire circumferential direction, and
the mark portion is located between the first group and the second group in the tire circumferential direction.

* * * * *